United States Patent
Theodore

[15] 3,670,232
[45] June 13, 1972

[54] PROTECTED POWER SUPPLY

[72] Inventor: Charles Theodore, Huntington Beach, Calif.

[73] Assignee: LTV Ling Altec, Inc., Anaheim, Calif.

[22] Filed: Nov. 9, 1970

[21] Appl. No.: 87,690

[52] U.S. Cl. .................................. 321/14, 321/5, 321/47
[51] Int. Cl. ............................. H02m 1/08, H02m 1/18
[58] Field of Search ....................... 321/5, 11.45 S, 14, 47; 317/31; 307/252 P

[56] References Cited

UNITED STATES PATENTS

| | | | |
|---|---|---|---|
| 3,443,197 | 5/1969 | Raver et al. | 321/47 X |
| 3,246,227 | 4/1966 | Strohmeier et al. | 317/31 X |
| 2,809,293 | 10/1957 | Rambo et al. | 321/14 |
| 3,408,552 | 10/1968 | Weber | 321/14 |
| 3,469,170 | 9/1969 | Gyugyi | 321/47 X |
| 3,323,017 | 5/1967 | Powell et al. | 317/31 X |
| 3,364,408 | 1/1968 | Katz et al. | 321/45 S |
| 3,462,671 | 8/1969 | Lawn | 321/47 |

*Primary Examiner*—William H. Beha, Jr.
*Attorney*—Harry R. Lubcke

[57] ABSTRACT

A plural-phase rectifier having triggerable SCRs for rectification, with an oscillator energized from the output of the rectifier for triggering. A diode in each trigger lead with the cathode thereof connected to the trigger of the SCR to prevent inter-SCR triggering when the power supply is short-circuited. Under short-circuit the power supply ceases to operate within a fraction of a cycle of the alternating current being rectified.

12 Claims, 5 Drawing Figures

PATENTED JUN 13 1972 3,670,232

INVENTOR
CHARLES THEODORE

BY Harry R. Lubcke
AGENT

PROTECTED POWER SUPPLY

BACKGROUND OF THE INVENTION

This invention relates to electrical rectifiers in which very rapid acting protection is afforded by the inherent circuit of the device in case of a short-circuit upon the output thereof.

The use of fuses or circuit breakers in the supply lines of an electrical device for its protection is known. However, these elements require replacement or re-setting. In certain fields, such as that of military equipment, the use of these elements is forbidden and the apparatus involved is subject to catastrophic failure.

SUMMARY OF THE INVENTION

The combination and arrangement of certain elements in the circuit of the power supply according to this invention makes it self-protecting. If shorted at the output or any point internal beyond the rectifiers it will neither destroy itself nor blow fuses or circuit breakers; it will shut itself off and not resume significant operation until the short is removed. Thereafter it will resume operation automatically.

Triggerable semiconductor devices, such as silicon controlled rectifiers (SCR's) are triggered by an oscillator that operates from the output voltage of the power supply. When there is no output voltage due to a short-circuit, the oscillator immediately becomes inoperative and the SCRs are not triggered.

However, it was discovered that the cathode to anode voltage drop caused by the heavy short-circuit current through the SCR's was sufficient to produce a triggering potential from one SCR to the next, and so these devices became self-triggering. A unilaterally conductive element, typically a diode, inserted in each triggering lead of the SCR's, with the cathode of the diode connected to the trigger terminal of each SCR, allows normal triggering impulses to pass to the trigger terminal but suppresses any potential originating there that would otherwise pass elsewhere in the circuit and trigger an adjacent SCR.

This power supply is useful in many fields, but it is particularly applicable where reliability and automatic functioning are significant. These include airplane, vehicular and unattended installations.

DESCRIPTION OF THE PREFERRED EMBODIMENTS

Herein the term plural-phase may also be considered polyphase, with typically three phases intended, but with two phases and other multi-phases included, such as six-phase.

The frequency of the alternating current power may have any value, but 60 and 400 hertz (cycles per second) may be considered typical. The invention is particularly applicable for frequencies perhaps at and very definitely above 60 hertz at this time, since the recovery time of obtainable SCRs under short-circuit conditions is longer than the time available for recovery and the phenomenon of self-triggering persists.

Figure 1:
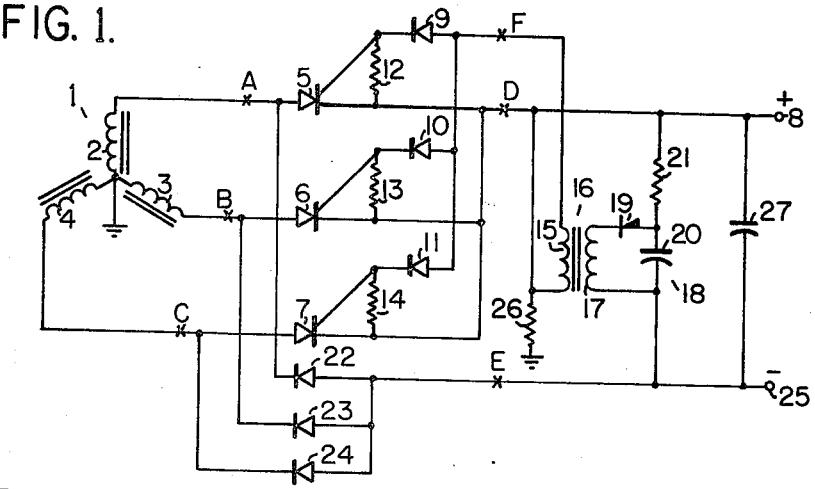
FIG. 1 is the schematic diagram of a plural (three) phase full-wave rectifier of preferred form.

The basic embodiment of the invention embraces half-wave rectification. On a three-phase apparatus this requires three SCR's. However, the sometimes termed "half-bridge" arrangement requires only three more diodes to carry the opposite polarity of the alternating current and then full-wave rectification is obtained. Such an output has the more desirable and easily filterable six-phase ripple. FIG. 1 is of this preferred form.

In FIG. 1, numeral 1 generally indicates a source of plural-phase (three-phase) alternating current electric power. Typically, coils 2, 3, 4 represent secondaries of a three-phase transformer, the primaries for which have not been shown. The center of this star connection has been shown grounded. This mode of connection is usual for aeronautical practice. However, a transformer is not required for the functioning of this invention. In this case power source 1 may be taken as the alternator which produces three-phase electric power. Two-phase, even single-phase, and other multiple-phase power sources will be comprehended insofar as these are involved in this invention from the above and other explanations herein.

In FIG. 1 the output conductor from coil 2 has the designation (phase) A, with a small cross thereupon for identification in succeeding figures, the conductor from coil 3 is B, and the conductor from coil 4 is C. These conductors connect, respectively, to the anodes of triggerable semiconductor devices (SCR's) 5, 6, 7. These devices are known and may be of any rating; the G.E. C137N being one example, with which 50 amperes of rectified current may be made available at the output of the rectifier. With a 115-volt a. c. input a d. c. output voltage of 250 volts is obtained because of the bridge connection of the rectifier.

The cathodes of SCR's 5, 6, 7 are connected together and to point D, which is also directly connected to the positive d. c. output terminal 8. The triggers of these SCR's are individually connected, respectively, to unilaterally conductive elements 9, 10, 11. These are typically semiconductor diodes of relatively low current but rapid recovery type, as the 1N4148. The cathodes of each of these connect to the triggers of the SCR's and also to a d. c. return, from trigger to cathode for each SCR; this being a resistor 12, 13, 14, each having a resistance within the range of from 100 to 1,000 ohms. The anodes of diodes 9, 10, 11 are connected together and to one terminal of secondary 15 of transformer 16.

Transformer 16 constitutes isolating means from the means to trigger the SCR's, allowing the d. c. path of diodes 9, 10, 11 to be returned to positive output terminal 8. Primary 17 is connected across the means to trigger, in this case oscillator 18. This oscillator may be of any type, but typically is comprised of four-layer diode 19, of 30-volt rating, and capacitor 20 connected in series across primary 17, with resistor 21 connected to the common connection between the four-layer diode and the capacitor and also connected to output terminal 8. A resistance in the range of from 100,000 to 250,000 ohms is suitable for resistor 21. The frequency of operation of the oscillator is inversely proportional to this resistance value. Should another type of oscillator be employed that operated at the d. c. potential of terminal 8, the transformer would not be required.

The oscillator 18 that has been shown typically provides pulses. Transformer 16 may then be a known pulse transformer, these being small, light-weight and inexpensive. A 1-to-1 ratio is suitable. Should an oscillator be chosen that produces sinusoidal waveshape, then transformer 16 should suitably carry such energy, although nominal distortion of the waveshape is not important to the functioning of this invention.

The frequency of oscillation of oscillator 18 is not critical. It should be a frequency greater than about three times the frequency of the a. c. electrical energy originating at power source 1, and typically about twelve times. The object is that the oscillator frequency be high with respect to the power frequency, so that when the voltage on a particular phase of the plural-phase power reaches a value capable of causing conduction in an SCR the trigger of the SCR involved will be quite promptly supplied with a voltage that allows conduction. A suitably high frequency also prevents variation of the output voltage (unfiltered d. c.) from the SCR's. For a 400-hertz power frequency an oscillator frequency of 5,000 hertz is suitable. For such a frequency capacitor 18 may have a capacitance of 0.1 microfarad, and resistor 21 a resistance of 250,000 ohms.

The embodiment of FIG. 1 being a full-wave rectifier, the negative waveform polarity of each phase is rectified by power unilateral conductors; i.e., diodes 22, 23, 24. These are in circuit with the cathode of each connected, respectively, to phase conductors A, B, and C. The anodes are connected together and to conductor E, which terminates in negative terminal 25, at the output of the power supply. Filter capacitor 27 is normally provided, connected between conductors D and E, to smooth the six-phase ripple involved. It may have a capacitance of 50 microfarads.

It is necessary that oscillator 18 start oscillating within about one second after the rectifier as a whole has been turned "on." Otherwise, triggering voltage is not applied to SCR's 5, 6, 7, and these cannot conduct. Accordingly, resistor 26 is provided, connected between conductor D and ground, and output voltage is produced between conductor E and ground. Phase-to-phase voltage is not involved in this initial situation. Power diodes 22, 23, 24 complete a circuit through ground from resistor 26 and capacitor 27 and/or conductivity of a load (not shown) connected between terminals 8 and 25 to the ground at the neutral of power source 1. The negative voltage built up on conductor E starts the oscillator oscillating, the oscillator being connected to conductor E as well as to conductor D.

Resistor 26 and this mode of functioning come into play after a short-circuit of the power supply, as across terminals 8 and 25, has been removed. The time required for the negative voltage on E to build up depends upon the resistance value of resistor 26 and the capacitance value of capacitor 27. A preferred value of resistance lies in the range of from 50,000 ohms to 1 megohm, with the time of build up of about one second. This interval postpones the operation of the power supply as a whole after a short-circuit so that the cause and/or effect thereof may be dissipated and normal operation hopefully resumed.

The self-protective functioning of the power supply occurs because of two aspects of its operation. First, as soon as a short-circuit occurs across output terminals 8 and 25, due to external causes of a load upon these terminals or due to an internal failure, such as the shorting of capacitor 27, the voltage to operate oscillator 18 reduces to zero, or to approximately zero. SCR's 5, 6, 7 thus remain open-circuited, since there is no trigger energy to allow conduction between the cathode and the anode thereof. Second, while the anode to cathode voltage drop in each of SCR's 5, 6, 7 is small when the rectifier is operating at normal current output, this raises to an amplitude of a few volts under the excessive current of a short-circuit. In embodiments prior to the present invention diodes 9, 10, 11 were not employed. Thus, the voltage drop effective for triggering, which is approximately half the anode to cathode voltage drop, occurring when one of SCRs 5, 6, or 7 was conducting was sufficient to pass from one gate to another along conductor F and to trigger the next-to-conduct current of these SCR's in accordance with the successive maxima of the plural-phase electric power. Since the currents involved are excessive under short-circuit conditions, the recovery time for the SCR's is also excessively long. Thus one SCR is more than usually susceptive to triggering from another despite the time differential between maxima of voltage, current and power in a plural-phase system. Such cross-triggering was repeatedly encountered in practice.

A positive voltage pulse is required for triggering an SCR. With diodes 9, 10, 11 employed, as in FIG. 1, a positive pulse or potential originating at any of the triggers of SCR's 5, 6, or 7 encounters the cathode of the corresponding diode 9, 10, or 11. It is well known that diodes are unilaterally conductive and that a positive pulse or potential on the cathode of the same will not result in any current flow at all. Thus, any and all positive voltage excursions of a trigger are restricted to that element and connot pass elsewhere throughout the circuit of the power supply.

In practice, the effect of the circuit of this invention is to shut off the power supply when a short-circuit occurs, regardless of which one of the SCR's 5, 6, or 7 are conducting. This is a very rapid and automatic shut off that prevents damage to the power supply, the power source, including fuses or circuit breakers, and the load itself, beyond that in the load that caused the short circuit in the first place.

Figure 2:
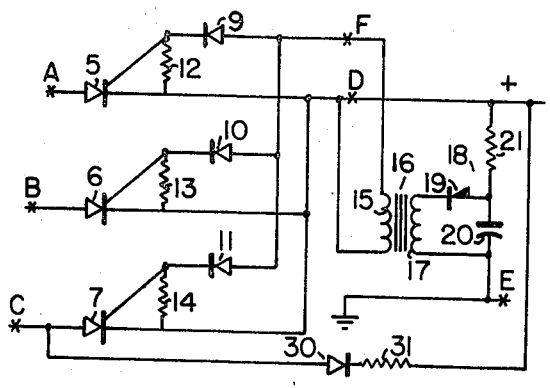
FIG. 2 is the same for an alternate form of circuit, for half-wave rectification.

The alternate embodiment of FIG. 2 closely follows that of FIG. 1, save that this is for a half-wave rectifying power supply instead of a full-wave power supply. The principal modification is that power diodes 22, 23, 24 are absent. The several elements that are present in FIG. 2 as well as in FIG. 1 have the same identifying numerals.

When the power diodes are absent the prior arrangement of resistor 26 for starting the oscillator of the power supply cannot be used. Accordingly, a unilaterally conductive device, low power diode 30, which may be of the 1N4005 type, is connected from one input phase conductor, say C, through an impedance, as resistor 31, to positive conductor D. Resistor 31 may have a resistance within the range of from 100,000 ohms to 1 megohm. Negative conductor E is now connected to ground.

FIG. 2 may be considered a fragmentary schematic diagram. The several points A, B, C, D, E and F connect to correspondingly lettered points in FIG. 1 to complete the diagram of FIG. 2 to that of FIG. 1. On the other hand, with three-phase power impressed at points A, B and C, with the positive output taken at D and the negative output taken at E, the showing of FIG. 2 is complete and operable.

Figure 3:
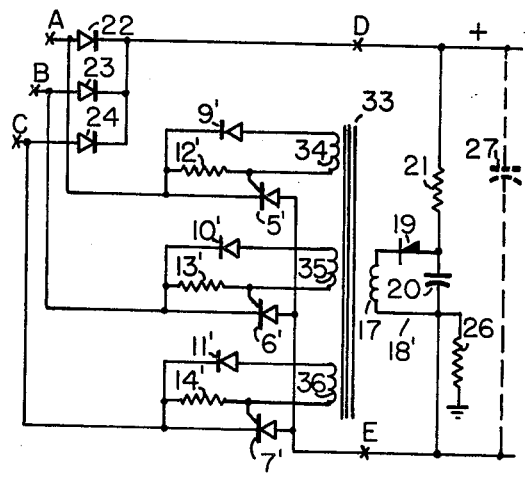
FIG. 3 is the same for a further alternate for full-wave rectification, but with the power rectifying elements interchanged and with concomitant changes in the rest of the circuit.

FIG. 3 shows the modifications required in the circuit of FIG. 1, should the positions of the power diodes and the SCR's be interchanged. The arrangement of FIG. 3 allows power SCR's 5', 6', 7' to be electrically and mechanically connected to one common heat sink. This is not possible with the opposite polarity of these elements in FIG. 1. In FIG. 3 the anode heat sink of the SCR's is connected to the E conductor. Diodes 22, 23, 24 are now also reversed in polarity with respect to their polarity in FIG. 1. The cathodes thereof are connected together and to conductor D.

It is impossible in FIG. 3 to provide triggering impulses from a single transformer secondary, as 15 in FIG. 1, since the common cathode reference of the SCR's is not present. Thus, a new transformer 33, having three secondaries 34, 35, 36 is provided. Primary 17 and the rest of the oscillator may be as before. Primed numerals represent previously identified elements but in different circuit configuration in FIG. 3.

Diodes 9', 10', 11' connect between secondaries 34, 35, 36 and the triggers of SCR's 5', 6', 7', respectively. Resistors 12', 13', 14' return to the cathodes of the SCRs from the trigger involved in each instance.

Isolating diodes 9', 10', 11' are required despite the use of separate transformer secondaries in FIG. 3. The false triggering electrical energy originating because of the short-circuit current through the SCR's has certain components of alternating current (and voltage). For any alternating current waveshapes or pulses the several secondaries of transformer 33 are electrically tied together. A current which originates in one secondary will be induced into the other secondaries under the short-circuit conditions set forth previously herein.

Figure 4:
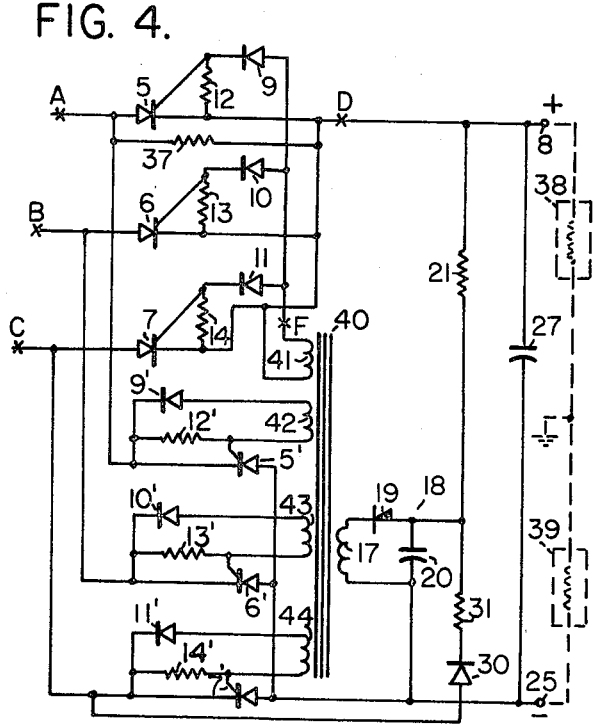
FIG. 4 is the same for a further alternate employing all controlled rectifiers (SCR's) for full-wave rectification.

FIG. 4 shows the modifications required in the circuit of FIG. 1 for all SCR's to be used rather than half SCR's and half power diodes. Simply put, the upper half of the SCR portion of FIG. 4 is a repeat of the upper half of FIG. 1, while the lower half of the SCR portion thereof is a repeat of the lower half of FIG. 3. The reference numerals follow their earlier use, with primes being used in the lower half to signify the same elements but in a slightly different circuit configuration.

Since there are no power diodes in FIG. 4, the single diode 30 and resistor 31 of FIG. 2 is employed to provide starting voltage for the oscillator, as has been explained.

Former transformer 33 of FIG. 3 becomes slightly more complicated as transformer 40 in FIG. 4, having an additional secondary 41; a total of four. Secondary 41 takes the place of original secondary 15 and triggers the upper three SCR's 5, 6, 7 according to the same circuit of FIG. 1. Secondaries 42, 43, 44 of FIG. 4 correspond to secondaries 34, 35, 36 of FIG. 3.

While a four-layer diode 19 of usual power capability will trigger up to three SCR's, as in FIG. 1, a four-layer diode of greater power capability is required to trigger six SCR's, as in FIG. 4. In circumstances where this would be inconvenient a simple transistor amplifier may be interposed between oscillator 18 and primary 17 of transformer 40 to raise the power level.

Resistor 37, ½ to 1 megohm, A to D, completes the starting circuit.

The circuit of FIG. 4 may be arranged to feed two loads. These are connected symmetrically with respect to ground and provide protection for the power supply and loads no matter in which load a short-circuit might occur. Load 38 is connected between terminal 8 and ground, while load 39 is connected between terminal 25 and ground. The loads may have various characteristics but have been shown as resistive.

The circuits of FIGS. 1-4 are particularly suitable for loads that are connected to output terminals 8 and 25 in which current is not drawn until the output voltage is appreciable, if not normal. One example of such a load is a pulse modulator. For a load of opposite characteristics, such as a series electric motor, the output voltage is more or less prevented from building up at all.

Figure 5:
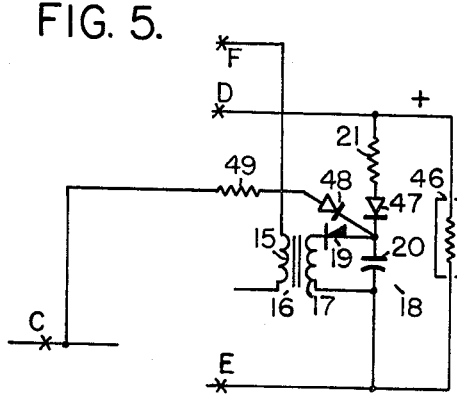
FIG. 5 is a fragmentary schematic diagram for a start-under-load rectifier modification.

For such loads a modification of the starting circuit to that of FIG. 5 allows voltage to build up across oscillator 18 independent of the starting impedance of the load. FIG. 5 is a fragmentary schematic diagram which finds its completion particularly in FIG. 1.

In addition to former resistor 21, which should have a resistance of the order of 100,000 to 250,000 ohms for all embodiments, diode 47 is now added in series therewith, with the cathode connected to oscillator 18.

The d. c. voltage to start oscillator 18 is provided by a connection to one of the incoming phase conductors, say C, as shown. This connection includes a low power rated diode 48 to provide rectification, having the cathode connected to the interconnection between four-layer diode 19 and capacitor 20, so that a positive voltage will be built up there. This takes the place on start-up that is handled by resistor 21 and the positive voltage on conductor D during normal operation, at which time the positive voltage on conductor D forward-biases diode 47. It then has negligible impedance to current flow required to operate oscillator 18.

Resistor 49 is included in series in the connection from phase C, as well as diode 48. Only a small current is required to start oscillator 18.

It is clear that diode 47 is back-biased when starting circuit C, 48, 49 is supplying a positive voltage for operating oscillator 18. This thus removes the relatively low impedance of load 46 from in shunt to the circuit of oscillator 18 and allows the start-up of the oscillator to be effective as described no matter what impedance the load might have. This circuit has a re-starting characteristic after a short-circuit has shut down the main power supply. This starting circuit attempts to start the power supply in about one second due to the time constant purposely built-in by resistor 49 and capacitor 20. As soon as the short-circuit at load 46 will have been cleared restarting is automatic.

Capacitor 27 has not been shown in FIG. 5 and is not required. This capacitor is included in any of the figures when the usual smoothed d. c. voltage is desired. It is excluded if the typically six-phase ripple resulting from full-wave three-phase rectification is not objectionable for the load involved.

I claim:

1. An overcurrent-protected plural-phase rectifier having an overloadable output (8,25) and having the same plurality of triggerable semiconductor devices (5,6,7) for rectification as the plurality of phases, said triggerable semiconductor devices connected to conductors (A,B,C) carrying said phases of electricity, comprising;
   a. normally oscillatory means to trigger (18) said triggerable semiconductor devices connected to the output of the rectifier to energize said means to trigger during normal and less than normal current flow at said output,
   b. starting means (26 or 30,31,etc.) to initially energize said means to trigger,
   said starting means connected between a conductor carrying electricity in said plural-phase rectifier and said means to trigger,
   c. the same plurality of unilaterally conductive elements (9, 10, 11) as said plurality of phases,
   each connected from said means to trigger to conduct triggering electrical energy therefrom, and
   d. a direct connection from each unilaterally conductive element to a trigger of a said triggerable semiconductor device, whereby electricity is conducted from said means to trigger to each said trigger and
   conduction of electricity of corresponding polarity from each said trigger to said means to trigger is inhibited,
   to prevent one said triggerable semiconductor device from triggering another said triggerable semiconductor device when at least said one triggerable semiconductor device is carrying excessive electric current because of greater than normal current flow at said overloadable output.

2. The rectifier of claim 1 in which;
   a. each said unilaterally conductive element is a diode having an anode and a cathode.

3. The rectifier of claim 2 in which;
   a. the anode of each said diode is connected to said means to trigger.

4. The rectifier of claim 1, which additionally includes
   a. isolating means (16) connected between said means to trigger and each of said unilaterally conductive elements.

5. The rectifier of claim 4 in which;
   a. said isolating means is an electrical transformer.

6. The rectifier of claim 4 in which said transformer has;
   a. a primary (17) connected to said means to trigger (18), and
   b. plural secondaries (34,35,36) individually connected to each said unilaterally conductive element (9', 10', 11')

7. The rectifier of claim 1 which additionally includes;
   a. the same plurality of power unilaterally conductive elements (22,23,24) as said plurality of phases oppositely connected to said conductors (A,B,C) carrying said phases with respect to the polarity of connection of said triggerable semiconductor devices thereto,
   and connected to the output of said rectifier,
   whereby full-wave rectification of electric power available at said conductors carrying said phases is accomplished.

8. The rectifier of claim 1 in which said starting means includes;
   a. a starting unilaterally conductive device (30),
   b. an impedance (31), and
   c. a series connection of said starting unilaterally conductive device and said impedance
   directly between a conductor (C) carrying a said phase of electricity and said means to trigger (18) for energizing said means to trigger.

9. The rectifier of claim 1 which additionally includes;
   a. an additional plurality of triggerable semiconductor devices (5', 6', 7') the same as the plurality of phases, oppositely connected to said conductors carrying the phases with respect to the polarity of connection of said triggerable semiconductor devices (5,6,7), and
   b. a connection from each of said additional plurality of triggerable semiconductor devices
   to the output (25) of said rectifier,
   whereby full-wave rectification of electric power available at said conductors (A, B, C) carrying said phases is accomplished.

10. The rectifier of claim 9 which additionally includes;

a. a pair of loads (38, 39)
    symmetrically connected between the output terminals (8, 25) of the rectifier and ground.
11. The rectifier of claim 9, which additionally includes;
a. multiple-output isolating means (40)
    having one input means (17),
    separate output means (42, 43, 44) individually connected to the trigger of each of said additional triggerable semiconductor devices (5', 6', 7')
    and a common output means (41) connected to the triggers of all of said triggerable semiconductor devices (5,6,7).
12. The rectifier of claim 1, in which said starting means includes;
a. auxiliary unilaterally conductive means (47) in the connection of said means to trigger (18) to said output (8) of the rectifier,
b. a connection directly from one of said conductors (C) carrying phases of electricity to said means to trigger,
    including a power-supplying unilaterally conductive means (48) and an impedance (49),
    to supply energizing electrical energy to said means to trigger regardless of the impedance of a load (46) connected to the output (8,25) of said plural-phase rectifier.

* * * * *